(12) United States Patent  
Dianda

(10) Patent No.: US 7,751,549 B1  
(45) Date of Patent: Jul. 6, 2010

(54) TANDEM SWITCH MIGRATION METHOD

(75) Inventor: Robert B. Dianda, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1149 days.

(21) Appl. No.: 11/375,649

(22) Filed: Mar. 14, 2006

(51) Int. Cl.
*H04M 7/00* (2006.01)

(52) U.S. Cl. .................................. 379/224; 379/221.13

(58) Field of Classification Search ............ 379/221.13, 379/114.27, 224, 230
See application file for complete search history.

(56) References Cited

U.S. PATENT DOCUMENTS

| | | | | |
|---|---|---|---|---|
| 5,793,857 A | * | 8/1998 | Barnes et al. | 379/221.13 |
| 5,867,569 A | * | 2/1999 | Martinez et al. | 379/114.27 |
| 5,995,609 A | * | 11/1999 | Melnyk et al. | 379/221.13 |
| 6,411,703 B1 | * | 6/2002 | Martinez et al. | 379/221.13 |

* cited by examiner

*Primary Examiner*—Thjuan K Addy

(57) ABSTRACT

A tandem switch migration method is provided according to the invention. The tandem switch migration method migrates at least some end users from an old tandem switch of a Public Switched Telephone Network (PSTN) to a new tandem switch using a Local Number Portability (LNP) capability. The method includes configuring a Local Routing Number (LRN) information of the PSTN in order to direct inbound cells from the PSTN through the new tandem switch and to an old node. The method further includes programming routing information of the new tandem switch to direct inbound calls from the PSTN to a new node after at least a portion of end users of the old node have been physically moved from the old node to the new node.

18 Claims, 6 Drawing Sheets

TANDEM SWITCH MIGRATION METHOD

BACKGROUND OF THE INVENTION

1. Field of the Invention

The invention is related to the field of switch migration, and in particular, to a tandem switch migration method.

2. Statement of the Problem

On occasion, the routing of communications between end users and an associated telephone network must necessarily be modified. For example, one or more switches may need to be replaced, upgraded, etc. If a node (such as a local switch) and an associated tandem switch are to be replaced, then many end users (and possibly multiple nodes) may need to be migrated to a new tandem switch. When a switch is to be replaced, the outbound and inbound calls must be changed over to the new tandem switch in order to ensure that all calls are delivered. It is imperative that the migration be accomplished swiftly in order to avoid or minimize a drop in service availability. The migration should be executed in a manner that enables the old node or nodes to be quickly and easily re-deployed if a problem occurs during the migration. If the migration is not successfully completed, the result can be a loss of service. In a worst case, the result can be an unacceptably long loss of service. If the migration is not properly and efficiently designed, the result can be a difficult, costly, and time-consuming change back to the original configuration and necessity to re-conduct the migration at a later time.

Local number portability is a scheme for allowing persons (and/or institutions) to keep an existing telephone number when moving to a new location or when switching to a new service provider. The LNP process is transparent to the caller and to the called party.

Before local number portability, telephone numbers were assigned to a local service-provider's end offices on an NPA-NXX basis. An NPA-NXX is defined as the Numbering Plan Area (NPA) and an office code (NXX) of an end user's telephone number (e.g., 123-456-7890). Each NPA-NXX can include up to 10,000 different telephone numbers. In the past, a telephone number identified the person/telephone, as well as the actual end office or telephone switching system that served the person. As a result, the dialed NPA-NXX was the terminating switch's routing address to the rest of the network. With the implementation of LNP, which allows any number of local service providers to serve the same NPA-NXX, this routing scheme could no longer be used.

The LNP architecture utilizes a unique 6-digit LRN to identify each switch in the network for call routing purposes. Each switch is assigned a LRN. Consequently, a LNP information entry correlates a dialed (i.e., destination) telephone number to a LRN of a terminating switch. The LRN is used to route the call to the terminating switch, and the original dialed telephone number is then used by the terminating switch to complete the call.

A LNP information (such as a LNP database, for example) is used to store the routing information for subscribers who have moved or ported to another local service provider. The LNP database can be accessed by a switch in order to route a call to a ported telephone number.

FIG. 1 shows a conventional, prior art LNP process, wherein a destination telephone number has been ported using the LNP capability. The source telephone initiates a telephone call to the destination telephone by dialing a destination telephone number. The dialed number is received in a local (originating) switch. The originating switch can signal a routing resource, such as a Signal Control Point (SCP), in order to obtain routing information for the destination telephone. The originating switch performs a "LNP dip" and accesses a LNP database or other LNP information. If the dialed number is in the LNP database, the telephone number has been ported via local number portability. If the dialed number is not in the LNP database, the dialed number is used to route and connect the telephone call. In this example, the LNP dip produces a 10 digit number, wherein the LRN is the first 6 digits. Herein the term subLRN refers to the use of all 10 digits for routing and connecting the telephone call, rather than using just the 6 digit LRN. This 10-digit number is substituted into a Called Party Number field (CdPN) of the call signaling, replacing the dialed number. The dialed number, however, is retained in a Generic Address Parameter (GAP) field of the call signaling for future use. The SCP provides the LRN and the dialed number back to the originating switch. The originating switch then routes and connects the telephone call to the terminating switch. The telephone call can transit any number of intermediate switches. The terminating switch receives the telephone call, according to the LRN (i.e., the first 6-digits of the CdPN). The terminating switch recognizes it's LRN, retrieves the dialed number from the GAP, and connects the telephone call to the destination telephone.

SUMMARY OF THE SOLUTION

A tandem switch migration method is provided according to the invention. The tandem switch migration method migrates at least some end users from an old tandem switch of a Public Switched Telephone Network (PSTN) to a new tandem switch using a Local Number Portability (LNP) capability. The method comprises configuring a Local Routing Number (LRN) information of the PSTN in order to direct inbound calls from the PSTN through the new tandem switch and to an old node. The method further comprises programming routing information of the new tandem switch to direct inbound calls from the PSTN to a new node after at least a portion of end users of the old node have been physically moved from the old node to the new node.

A tandem switch migration method is provided according to the invention. The tandem switch migration method migrates at least some end users from an old tandem switch of a PSTN to a new tandem switch using a LNP capability. The method comprises configuring a LRN information of the PSTN in order to direct inbound calls from the PSTN through the new tandem switch and over a trunk line to an old node. The trunk line comprises a Time Division Multiplex (TDM) trunk line. Signaling System 7 (SS7) signaling is exchanged between the new tandem switch and the new node. The method further comprises programming routing information of the new tandem switch to direct inbound calls from the PSTN to a new node after at least a portion of end users of the old node have been physically moved from the old node to the new node.

A tandem switch migration method is provided according to the invention. The tandem switch migration method migrates at least some end users from an old tandem switch of a PSTN to a new tandem switch using a LNP capability. The method comprises configuring a LRN information of the PSTN in order to direct inbound calls from the PSTN through the new tandem switch and over a trunk line to an old node. The trunk line comprises an Internet Protocol (IP) trunk line. Session Initiation Protocol (SIP) signaling is exchanged between the new tandem switch and the new node. The method further comprises programming routing information of the new tandem switch to direct inbound calls from the PSTN to a new node after at least a portion of end users of the old node have been physically moved from the old node to the new node.

DESCRIPTION OF THE DRAWINGS

The same reference number represents the same element on all drawings.

DETAILED DESCRIPTION OF THE INVENTION

FIGS. 2-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
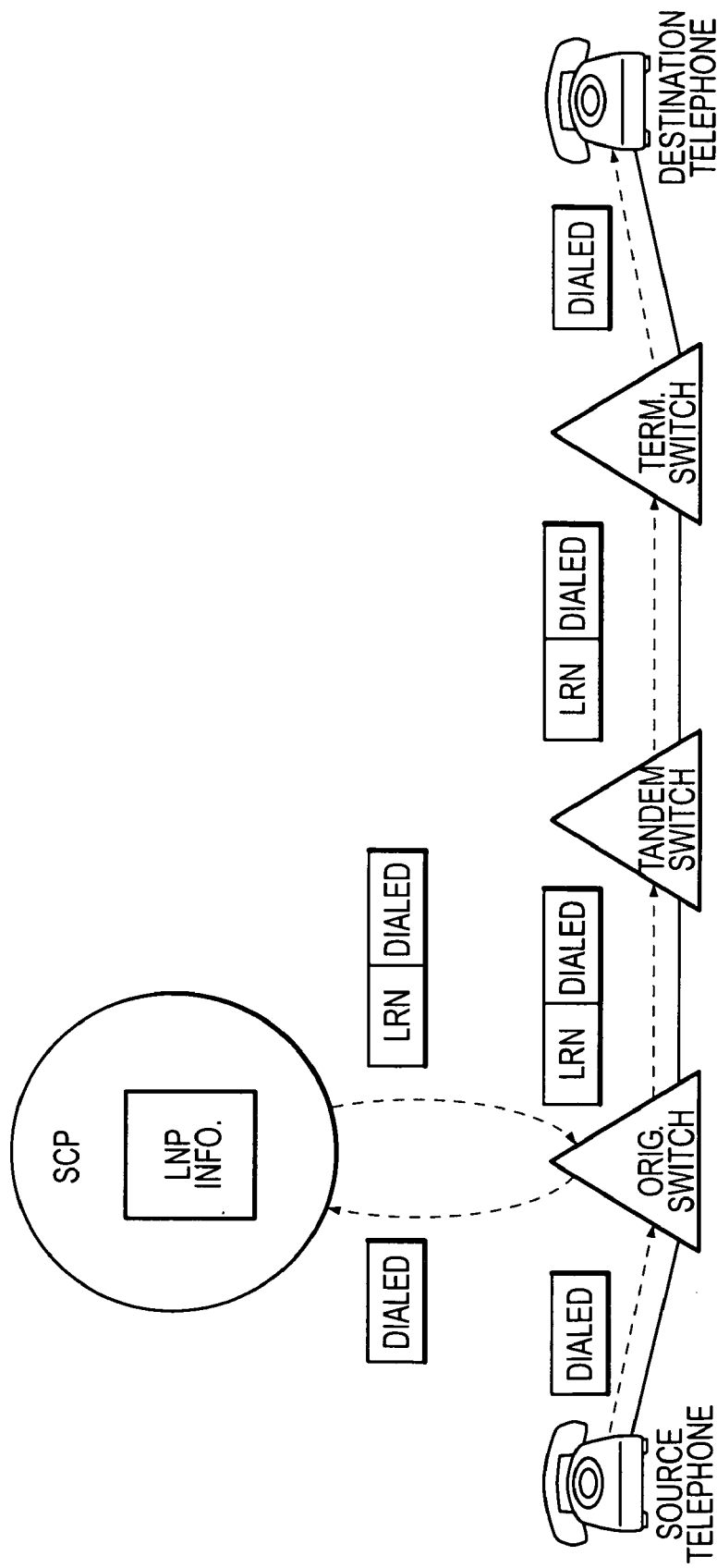
FIG. 1 shows a conventional prior art LNP process, wherein a destination telephone number has been ported using an LNP capability.
Figure 2:
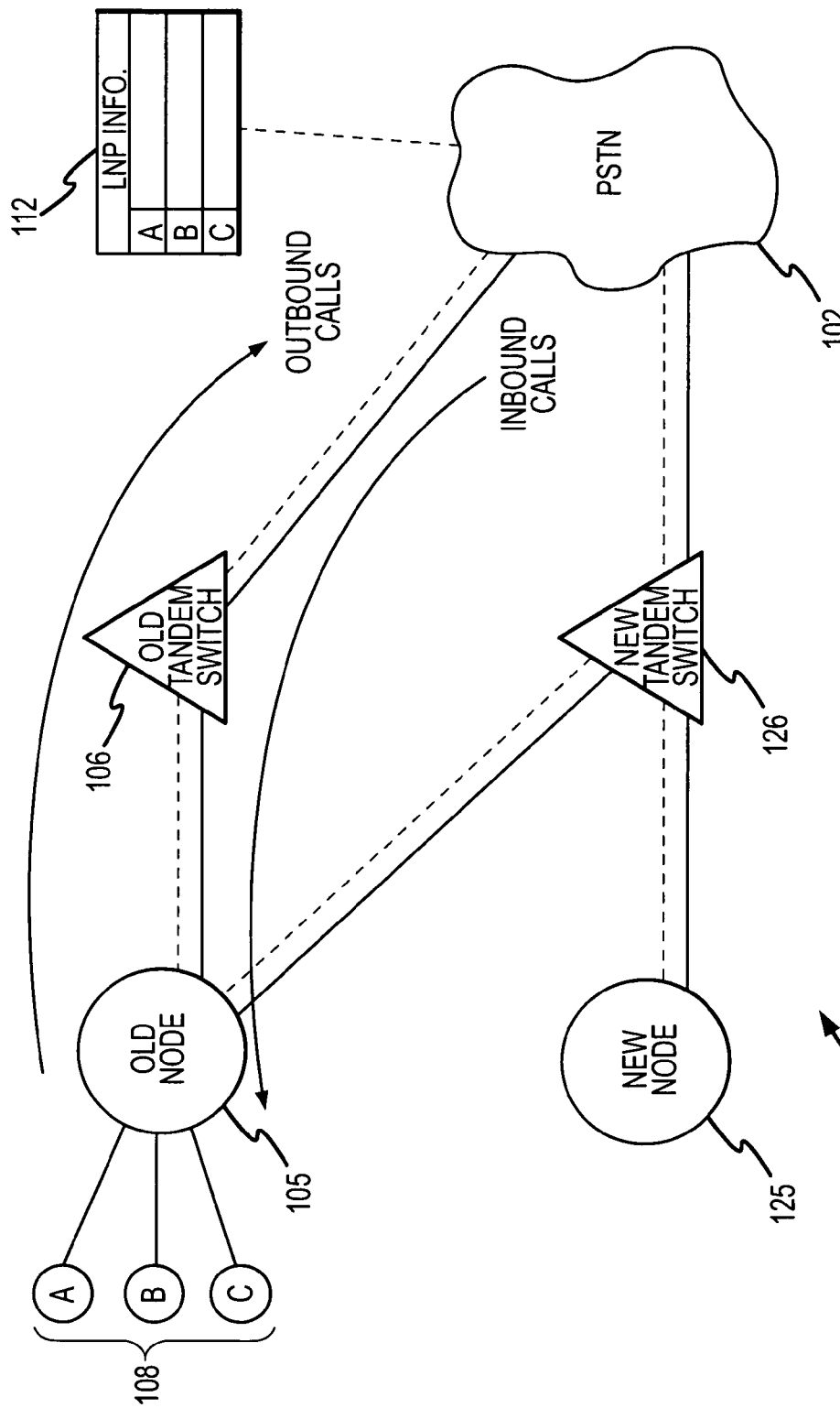
FIG. 2 shows a communication system according to an embodiment of the invention.

FIG. 2 shows a communication system 100 according to an embodiment of the invention. The communication system 100 includes a Public Switched Telephone Network (PSTN) 102, an old node 105, and an old tandem switch 106. A tandem switch is a switch that is located between two other switches and that relays communications between the switches. Here, the old tandem switch 106 is connected to both the old node 105 and a switch in the PSTN 102 (not shown). The PSTN 102 can communicate with Local Number Portability (LNP) information 112, such as to convert a called number to an Location Route Number (LRN), as needed. The old node 105 can be connected to a plurality of end users 108. The end users 108 can comprise wireline communication devices, such as telephones, for example. Alternatively, the end users 108 can comprise wireless communication devices, such as cellular telephones, for example.

Before migration, the communication system 100 can receive a new node 125 and a new tandem switch 126. The new tandem switch 126 is connected to the PSTN 102 by a Time Division Multiplex (TDM) trunk line and a signaling channel. The signaling channel in one embodiment comprises a Signaling System 7 (SS7) signaling channel. Likewise, the new node 125 can be connected to the new tandem switch 126 by a TDM trunk and an SS7 signaling channel. Alternatively, the new node 125 can be connected to the new tandem switch 126 by an Internet Protocol (IP) trunk line and a Session Initiation Protocol (SIP) signaling channel (see FIG. 6 and the accompanying discussion).

Before migration, inbound calls (or other communications) from the PSTN 102 to the end users 108 are routed and connected through the old tandem switch 106 and the old node 105. Likewise, outbound calls from the end users 108 into the PSTN 102 are routed and connected through the old node 105 and the old tandem switch 106. At this point in time, although the new node 125 and the new tandem switch 126 are physically connected to the PSTN 102 and to the old node 105, no communications for the end users 108 are routed or connected through the new tandem switch 126.

The end users 108 are to be migrated from the old node 105 to the new node 125. Concurrently, the end users 108 are to be migrated from the old tandem switch 106 to the new tandem switch 126. The end users 108 can all be migrated at once. Alternatively, the end users 108 can be migrated in groupings. In addition, where multiple old nodes 105 are connected to the old tandem switch 106, the end users 108 can be migrated by individual nodes or by node groupings.

Figure 3:
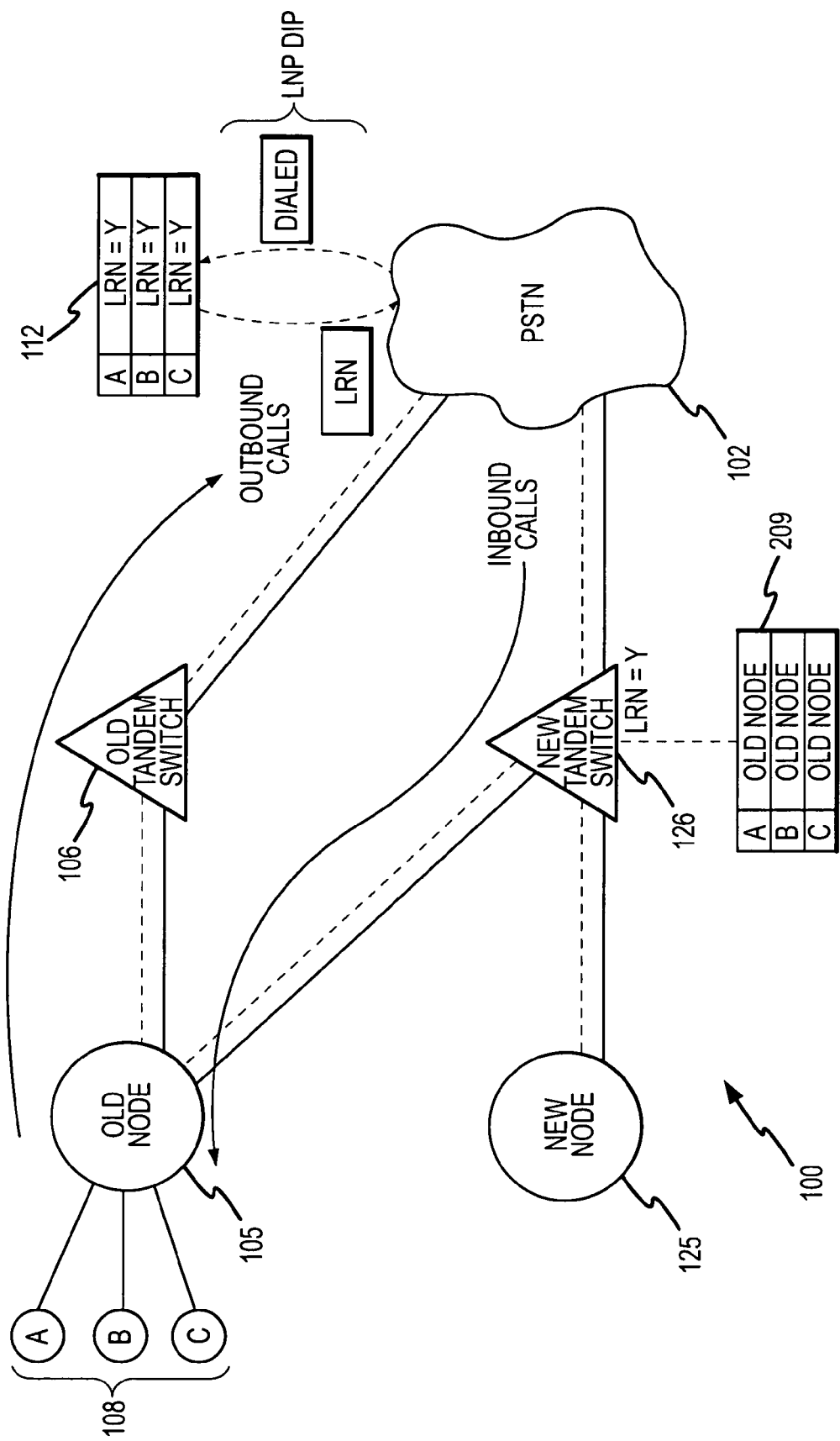
FIG. 3 shows the communication system after a first migration step according to an embodiment of the invention.

FIG. 3 shows the communication system 100 after a first migration step according to an embodiment of the invention. In this figure, the PSTN 102 includes a LNP information 112. The LNP information 112 can be stored in any manner of data structure, such as a database, for example. In one embodiment, the LNP information 112 can comprise part of an SCP (not shown) or can be accessed by an SCP. The PSTN 102 can consult the LNP information 112 in order to route an inbound call to an LNP-ported telephone number.

In the figure, the LNP information 112 has been modified, wherein at least some of the end users 108 have been given LRN numbers for purposes of the migration. In this example, end users A-C have been changed to a LRN of Y, with Y being the LRN of the new tandem switch 126. As a result, for an inbound telephone call destined for telephone A, the LNP dip will return LNP=Y and the inbound telephone call will be routed and connected through the new tandem switch 126 (see arrow). The new tandem switch 126 will recognize the destination switch's LRN and will route and connect the inbound telephone call through the old node 105, using the 6-digit LRN prefix or the 10-digit sub-LRN.

The LNP data entries can be assigned to the end users 108 as a group, such as all end users having a particular NPA-NXX number being assigned the same entry in the LNP database. This entry can either be a LRN or a subLRN. The invention can use a subLRN in order to allow multiple groups to have the same 6-digit LRN prefix. Routing the sub-LRN grouping therefore comprises the new tandem switch 126 routing on the entire 10-digits in the Called Party Number field (CdPN), instead of routing on just the 6-digit prefix (i.e., the LRN). It should be understood that normal routing of a telephone call is performed on the first 3 or 6 digits of the telephone number, except at the destination end office. In this manner, a sub-LRN grouping can enable less than all of the end users of the old node 105 to be migrated at a time, if desired.

It should be understood that outbound calls from an end user 108 to the PSTN 102 will not be affected (see arrow). At this point in the migration, outbound calls will still pass through the old node 105 and the old tandem switch 106.

Figure 4:
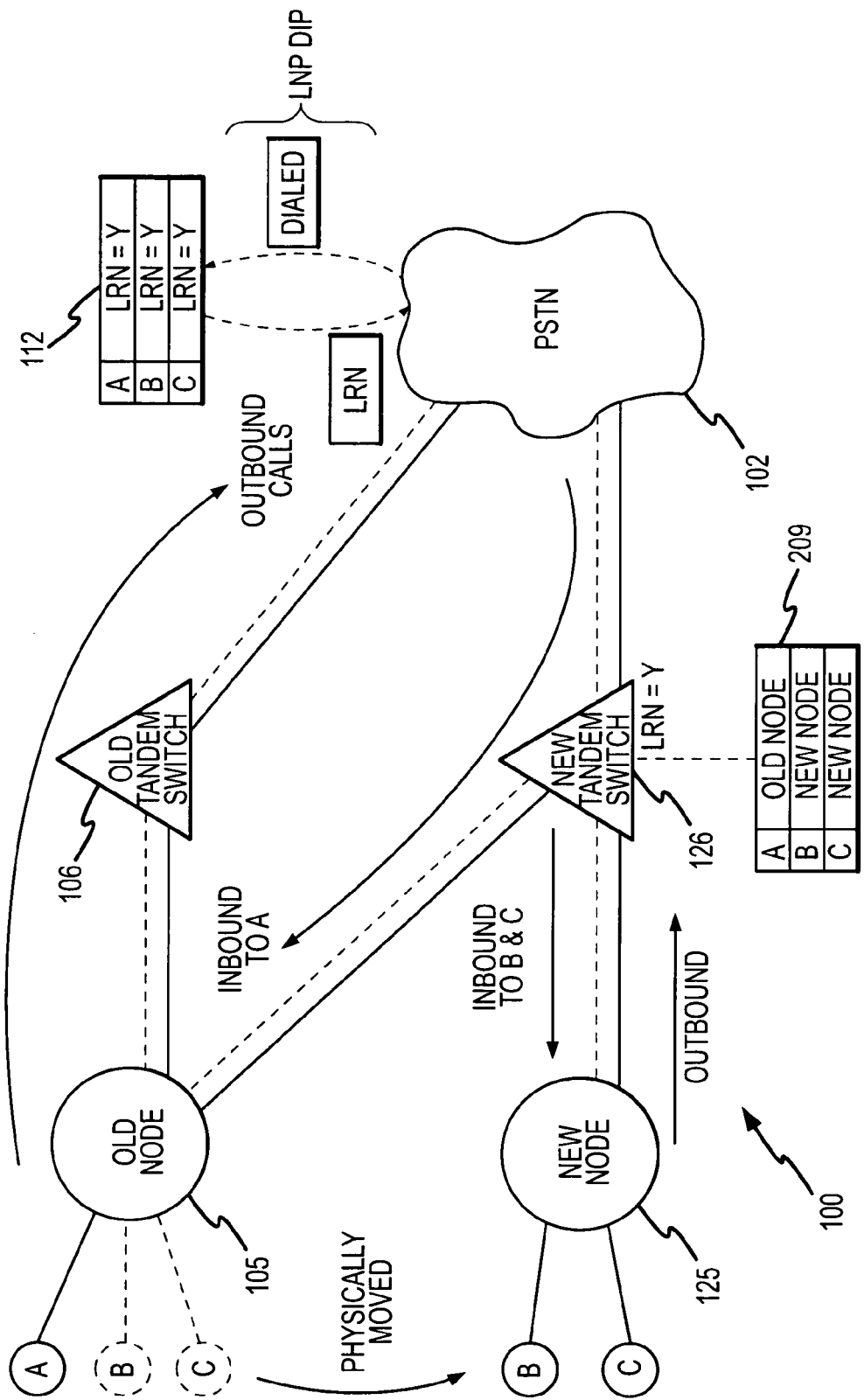
FIG. 4 shows the communication system after a second step of the migration process according to an embodiment of the invention.

FIG. 4 shows the communication system 100 after a second step of the migration process according to an embodiment of the invention. In this step, the end users 108 (or a sub-LRN grouping) are physically moved from the old node 105 to the new node 125. This can comprise physically moving the end user connecting wires, cables, fibers, etc., to the new node 125. Concurrently, the routing information 209 of the new tandem switch 126 is modified. The routing information 209 is changed from previously pointing to the old node 105 to now pointing to the new node 125.

In the figure, telephones B and C have been physically moved. In addition, telephones B and C have been programmed in the routing information 209. However, telephone A has not been physically moved and has not been programmed in the routing information 209. Consequently, outbound and inbound calls for telephones B and C will transit both the new node 125 and the new tandem switch 126. An outbound call originating from telephone A will transit the old node 105 and the old tandem switch 106. However, an inbound call destined for telephone A will transit the new tandem switch 126 and the old node 105.

Figure 5:
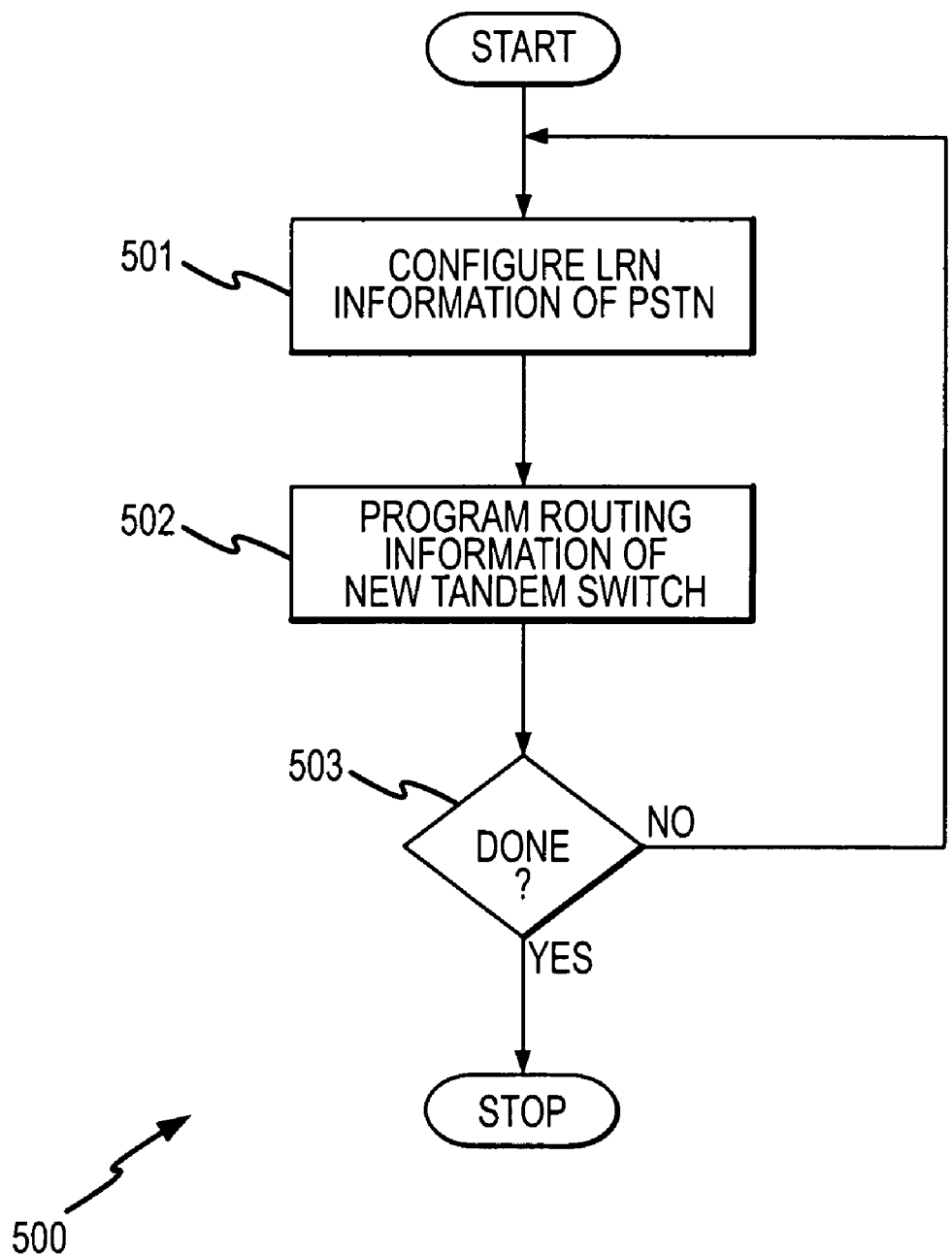
FIG. 5 shows a flowchart of a tandem switch migration method according to an embodiment of the invention.

FIG. 5 shows a flowchart 500 of a tandem switch migration method according to an embodiment of the invention. In step 501, LRN information of a PSTN is configured to direct inbound calls to the new tandem switch for at least some of the end users. At least some of the end users are assigned LRN values that direct the inbound calls to the new tandem switch. At this point in time, inbound calls pass through the new tandem switch and then to an old node.

In step 502, routing information of the new tandem switch is programmed to direct the inbound calls to a new node. At substantially the same time, the selected end users are physically migrated to the new node. Inbound calls from the PSTN to the migrated end users pass through the new tandem switch and the new node. In addition, outbound calls from the migrated end users to the PSTN now pass through the new node and the new tandem switch.

In step 503, if the migration to the new tandem switch and the new node is done, then the method exits; otherwise it branches back to step 501. In this manner, groupings of end users can be iteratively migrated to the new node and to the new tandem switch. A grouping can comprise a sub-LRN grouping, for example. In addition, where the old node comprises multiple nodes, the method can iteratively move multiple old nodes over to multiple corresponding new nodes.

Figure 6:
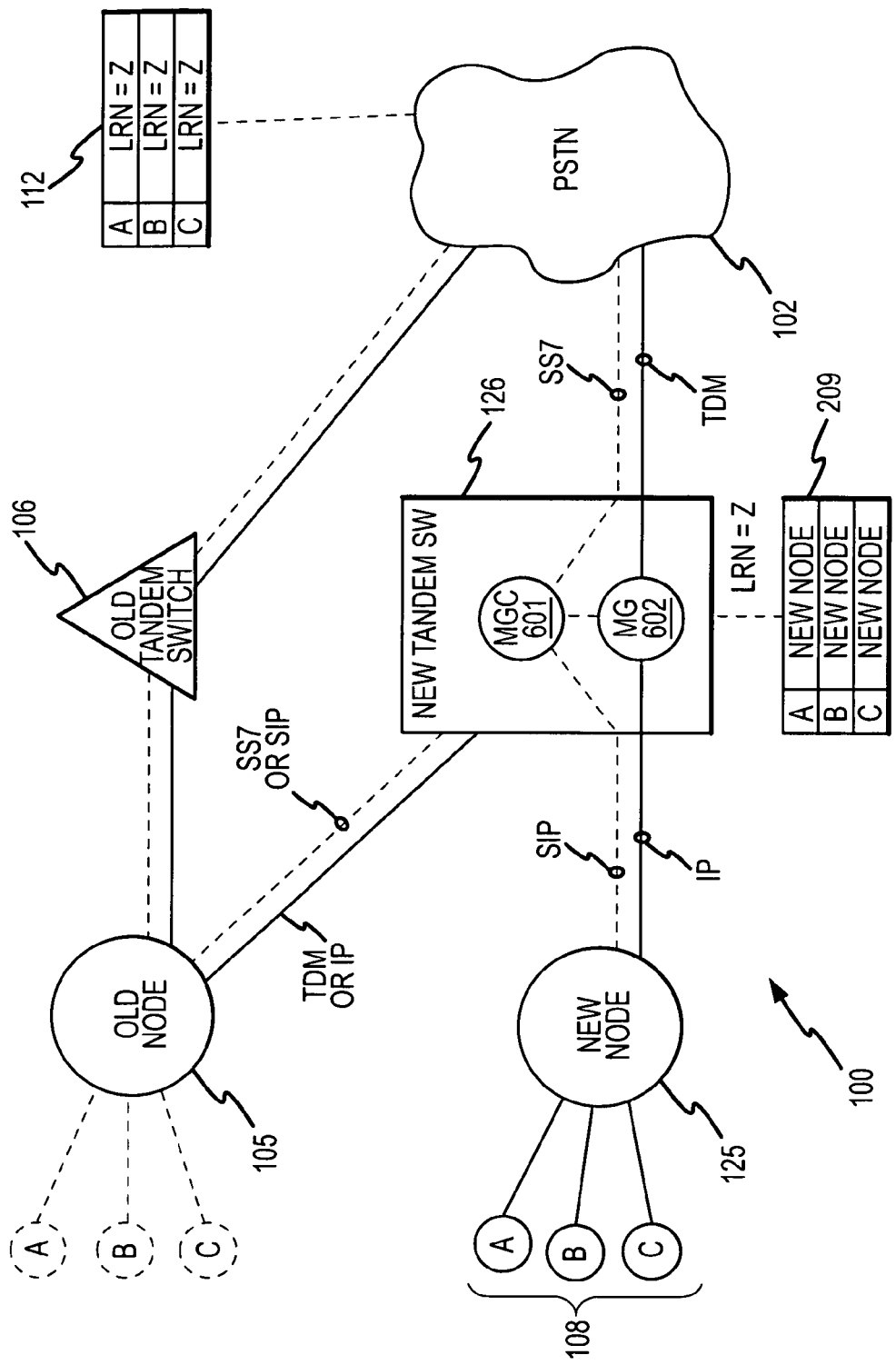
FIG. 6 shows the communication system including an alternative new tandem switch according to an embodiment of the invention.

FIG. 6 shows the communication system 100 including an alternative new tandem switch according to an embodiment of the invention. In this embodiment, the new tandem switch 126 comprises a Media Gateway (MG) 602 combined with a Media Gateway Controller (MGC) 601. Exchanging communications between unlike networks is the function of a gateway. The MG 602 receives TDM voice calls from the PSTN 102, converts the TDM voice calls to Internet Protocol (IP) packets, and transfers the packets to the new node 125 (and vice versa). The MGC 601 exchanges SS7 signaling with the PSTN 102 and exchanges SIP signaling with the new node 125 in order to control the MG 602 and to control the exchange of outbound and inbound calls. In addition, the new tandem switch 126 can exchange SS7 signaling with the old node 105 and can relay TDM telephone calls between the old node 105 and the PSTN 102.

In this embodiment of the communication system 100, the LNP capability can again be used to migrate end users 108 from the old node 105 and the old tandem switch 106 to a new node 125 and a new tandem switch 126. The LNP information 112 can first be changed, wherein the LRN directs inbound calls to the new tandem switch 126, as before. The routing information 209 of the new tandem switch 126 is then programmed to include migrated end users, substantially concurrently with physically moving the end users to the new node 125.

In this embodiment, the new node 125 can comprise a component of a packet network. The new node 125 can comprise a component of a wireless network. For example, the new node 125 can comprise a Base Transceiver Station (BTS) of a cellular telephone network. Therefore, migration to the new tandem switch 126 can provide an opportunity to upgrade or change the capabilities of the communication system 100.

The tandem switch migration method according to the invention can be employed according to any of the embodiments in order to provide several advantages, if desired. The invention provides an organized and efficient migration method. The invention provides a migration method that can be easily reversed if problems occur. The invention provides a migration method where not all end users are required to be migrated at one time. The invention provides a migration method where migration can be performed for groupings of end users.

The invention claimed is:

1. A tandem switch migration method to migrate at least some end users from an old tandem switch of a Public Switched Telephone Network (PSTN) to a new tandem switch using a Local Number Portability (LNP) capability, the method comprising:
configuring a Local Routing Number (LRN) information of the PSTN in order to direct inbound calls from the PSTN over a first Time Division Multiplex (TDM) trunk line through the new tandem switch and to an old local service node, wherein SS7 signaling is exchanged between the PSTN and the new tandem switch;
programming routing information of the new tandem switch to direct inbound calls for only a portion of the end users from the PSTN to a new local service node after the portion of the end users of the old local service node have been physically moved from the old local service node to the new local service node; and
configuring the old local service node to route outbound calls through the old tandem switch to the PSTN for remaining end users that have not been physically moved from the old local service node to the new local service node.

2. The method of claim 1, with the configuring the LRN information comprising configuring LRN information for at least the portion of the end users of the old local service node.

3. The method of claim 1, with the configuring the LRN information comprising configuring LRN information for all end users of the old local service node.

4. The method of claim 1, further comprising iteratively performing the configuring and programming steps and moving groupings of end users until all end users are migrated to the new local service node.

5. The method of claim 1, wherein a second trunk line extending between the new tandem switch and the old local service node comprises a TDM trunk line and wherein SS7 signaling is exchanged between the new tandem switch and the old local service node.

6. The method of claim 1, wherein a third trunk line extending between the new tandem switch and the new local service node comprises a TDM trunk line and wherein SS7 signaling is exchanged between the new tandem switch and the new local service node.

7. The method of claim 1, wherein a third trunk line extending between the new tandem switch and the new local service node comprises an IP trunk line and wherein SIP signaling is exchanged between the new tandem switch and the new local service node.

8. The method of claim 1, wherein the new local service node comprises a Base Transceiver Station (BTS).

9. A tandem switch migration method to migrate at least some end users from an old tandem switch of a Public Switched Telephone Network (PSTN) to a new tandem switch using a Local Number Portability (LNP) capability, the method comprising:

configuring a Local Routing Number (LRN) information of the PSTN in order to direct inbound calls from the PSTN over a first Time Division Multiplex (TDM) trunk line through the new tandem switch and over a second TDM trunk line from the new tandem switch to an old local service node, wherein Signaling System 7 (SS7) signaling is exchanged between the PSTN and the new tandem switch and between the new tandem switch and the old local service node;

programming routing information of the new tandem switch to direct inbound calls for only a portion of the end users from the PSTN to a new local service node after the portion of end users of the old local service node have been physically moved from the old local service node to the new local service node; and configuring the old local service node to route outbound calls through the old tandem switch to the PSTN for remaining end users that have not been physically moved from the old local service node to the new local service node.

10. The method of claim 9, with the configuring the LRN information comprising configuring LRN information for at least the portion of the end users of the old local service node.

11. The method of claim 9, with the configuring the LRN information comprising configuring LRN information for all end users of the old local service node.

12. The method of claim 9, further comprising iteratively performing the configuring and programming steps and moving groupings of end users until all end users are migrated to the new local service node.

13. A tandem switch migration method to migrate at least some end users from an old tandem switch of a Public Switched Telephone Network (PSTN) to a new tandem switch using a Local Number Portability (LNP) capability, the method comprising:

configuring a Local Routing Number (LRN) information of the PSTN in order to direct inbound calls from the PSTN over a first Time Division Multiplex (TDM) trunk line through the new tandem switch and over a second trunk line to an old local service node, wherein Signaling System 7 (SS7) signaling is exchanged between the PSTN and the new tandem switch, wherein second trunk line an Internet Protocol (IP) trunk line, and wherein Session Initiation Protocol (SIP) signaling is exchanged between the new tandem switch and the old local service node;

programming routing information of the new tandem switch to direct inbound calls for only a portion of the end users from the PSTN to a new local service node after the portion of end users of the old local service node have been physically moved from the old local service node to the new local service node; and configuring the old local service node to route outbound calls through the old tandem switch to the PSTN for remaining end users that have not been physically moved from the old local service node to the new local service node.

14. The method of claim 13, with the configuring the LRN information comprising configuring LRN information for at least the portion of the end users of the old local service node.

15. The method of claim 13, with the configuring the LRN information comprising configuring LRN information for all end users of the old local service node.

16. The method of claim 13, further comprising iteratively performing the configuring and programming steps and moving groupings of end users until all end users are migrated to the new local service node.

17. The method of claim 13, wherein a third trunk line extending between the new tandem switch and the old local service node comprises a TDM trunk line and wherein SS7 signaling is exchanged between the new tandem switch and the old local service node.

18. The method of claim 13, wherein the new local service node comprises a Base Transceiver Station (BTS).

* * * * *